US008379995B2

(12) United States Patent
May et al.

(10) Patent No.: US 8,379,995 B2
(45) Date of Patent: Feb. 19, 2013

(54) IN-PICTURE PREDICTION FOR VIDEO CODING

(75) Inventors: Anthony R. May, Winchester (GB); Shih-Ta Hsiang, Schaumburg, IL (US); Faisal Ishtiaq, Chicago, IL (US); Zhu Li, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1283 days.

(21) Appl. No.: 12/121,316

(22) Filed: May 15, 2008

(65) Prior Publication Data
US 2009/0285499 A1 Nov. 19, 2009

(51) Int. Cl.
*G06K 9/36* (2006.01)
*G06K 9/46* (2006.01)
(52) U.S. Cl. ........................ 382/238; 382/243
(58) Field of Classification Search ............... 382/173, 382/236, 238, 243; 375/240.12, 240.13, 375/240.16, 240.24
See application file for complete search history.

(56) References Cited

U.S. PATENT DOCUMENTS

| 5,990,961 | A | 11/1999 | Bjontegaard | |
|---|---|---|---|---|
| 6,404,814 | B1* | 6/2002 | Apostolopoulos et al. | 375/240.12 |
| 2003/0072374 | A1* | 4/2003 | Sohm | 375/240.16 |
| 2004/0028282 | A1* | 2/2004 | Kato et al. | 382/236 |

OTHER PUBLICATIONS

Le Guen, Benjamin; "PCT Search Report and Written Opinion" European Patent Office—Rijswijk, completed Jul. 24, 2009, mailed Aug. 24, 2009.
Krutz et al., "Content-Adaptive Video Coding Combining Object-Based Coding and H.264/AVC" Picture Coding Symposium; Nov. 7, 2007, 4 pages. XP030080389.
Feig et al., "Image Compression Using Spatial Prediction" 1995 International Conference on Accoustics, Speech, and Signal Processing, 1995; vol. 4, May 9, 1995-May 12, 1995; pp. 2339-2342. XP010151810.
Richardson Iain E G: "H.264/MPEG-4 Part 10: Intra Prediction" Internet Citation, Retrieved from the Internet Oct. 7, 2002; URL: www.cvodex.com; 7 pages. XP002973807.
Krutz et al., "Motion-based Object Segmentation Using Sprites and Anisotropic Diffusion" 8th International Workshop on Image Analysis for Multimedia Interactive Services, (WIAMIS'07); Jun. 1, 2007; IEEE, 4 pages. XP031119822.

* cited by examiner

*Primary Examiner* — Phuoc Tran

(57) ABSTRACT

A method of coding video content. The method can include, identifying a first plurality of image blocks within a picture based on at least a first image characteristic that is common to each of the first plurality of image blocks. A first image block group can be dynamically defined. At least one of the image blocks can be selected as a predictor block to predict other image blocks within the first image block group. In another arrangement, at least a first image block and a second image block can be identified within a picture. The second image block can be predicted from the first image block. A displacement vector can be defined to associate the second image block with the first image block. A value representing the displacement vector can be included within a header of the second image block.

20 Claims, 5 Drawing Sheets

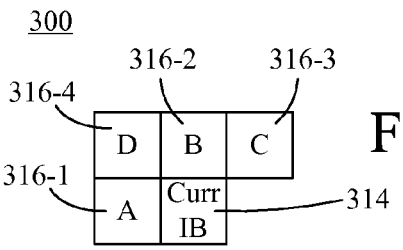
FIG. 3
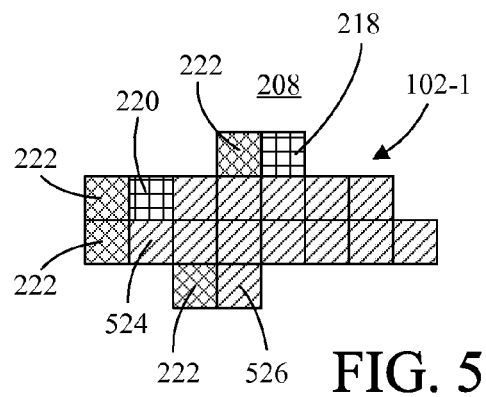
FIG. 5
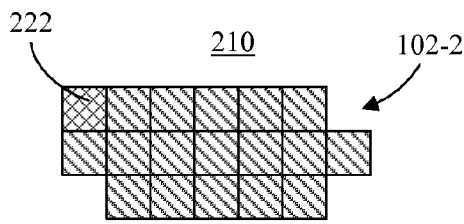
FIG. 4
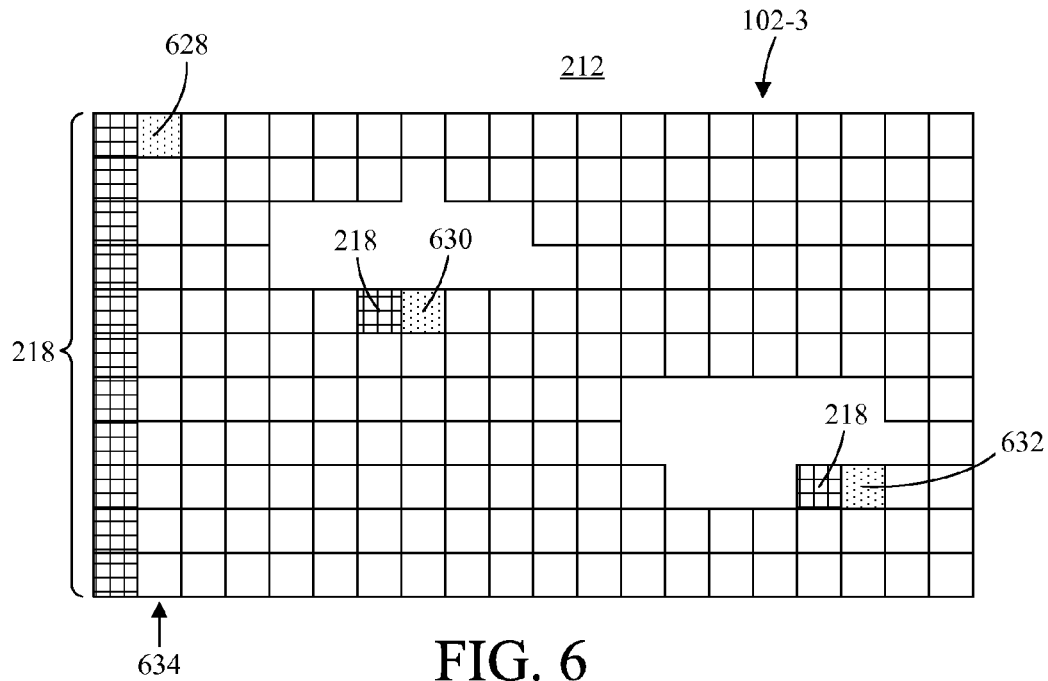
FIG. 6
FIG. 7

| | Flag 980 | Flag 982 | Flag 984 | Value 986 | Value 988 | Flag 990 | Flag 992 | Value 994 | Value 996 | |
|---|---|---|---|---|---|---|---|---|---|---|
| ... | | | | | | | | | | ... |

IN-PICTURE PREDICTION FOR VIDEO CODING

BACKGROUND OF THE INVENTION

1. Field of the Invention

The present invention generally relates to the storage of video information and, more particularly, to video coding schemes.

2. Background of the Invention

Over the past few decades, the primary format in which video content is stored and distributed has been shifting away from an analog format toward a digital format. Indeed, except for some television broadcasts, nearly all communication of video content is now performed digitally. One of the many advantages of digitally coding video content is that compression methods can be applied to reduce the amount of storage space and bandwidth required for video storage and transmission.

There are several types of video compression methods, some of which are implemented in accordance with various standards provided by the Moving Picture Experts Group (MPEG), such as MPEG-4. MPEG-4 is a developing standard that supports object based video coding, which allows objects to be manipulated before being merged to create a final scene that is presented to a viewer. The objects must be decoded independently from one another, however, so that they may be easily added to and removed from scenes. Hence, each object is part of an elementary stream that does not support prediction from objects in other elementary streams.

In contrast, scalable coding can be used to support prediction from previous and subsequent frames contained in other elementary streams, using either motion compensated or direct prediction for each macroblock, which typically represents a block of 16×16 pixels.

MPEG-4 is divided into a number of parts. Notably, MPEG-4 part 10, also known as H.264/AVC, is used by the HD DVD and Blu-ray Disc DVD formats, as well as broadcasting high definition video. H.264/AVC defines the concepts of slices and flexible macroblock ordering. A slice is a partition of a picture (i.e. frame) that must be able to be decoded without reference to other slices in the same picture. Use of flexible macroblock ordering in H.264/AVC removes the requirement that macroblocks in a slice must be coded in raster scan order. Accordingly, macroblocks in a single slice can be distributed over an entire picture, thus improving error resiliency and easing the task of error concealment in the event of that slice being lost. Notwithstanding, the coding efficiency of H.264/AVC still can be improved upon.

SUMMARY OF THE INVENTION

The present invention relates to a method of coding video content. The method can include identifying a first plurality of image blocks within a picture based on at least a first image characteristic that is common to each of the first plurality of image blocks. Further, a first image block group can be dynamically defined to comprise the first plurality of image blocks. At least one of the first plurality of image blocks can be selected as a predictor block for the first image block group. For each of the other image blocks in the first image block group, a respective second image characteristic that corresponds to a second image characteristic associated with the predictor block can be predicted. The picture can be output.

In one arrangement, the method further can include identifying within the picture a second plurality of image blocks based on at least a first image characteristic that is common to each of the second plurality of image blocks. At least a second image block group can be dynamically defined to comprise the second plurality of image blocks. Further, for at least one of the second plurality of image blocks (second image block), at least a second image characteristic associated with the second image block can be predicted from at least one of the first plurality of image blocks.

The present invention also relates to a method of coding video content, which can include dynamically identifying a first image block and at least a second image block within a picture. Such prediction can be based on at least a first image characteristic that is common to both the first image block and the second image block. From at least a second image characteristic associated with the first image block, at least a second image characteristic associated with the second image block can be predicted. A first displacement vector can be defined to associate the second image block with the first image block. A value representing the first displacement vector can be included within a header of the second image block. The picture can be output.

Yet another embodiment of the present invention can include a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which:

FIG. 3 depicts a plurality of image blocks useful for understanding the present invention;

FIG. 4 depicts image block prediction for an image block group defined in FIG. 2;

FIG. 5 depicts image block prediction for another image block group defined in FIG. 2;

FIG. 6 depicts image block prediction for another image block group defined in FIG. 2;

FIG. 7 depicts header elements of an image block group that are useful for understanding the present invention;

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to coding video content to achieve improved image coding efficiency, while not sacrificing video quality. In particular, one or more image block groups can be defined within a picture, and at least one image block within an image block group can be predicted, at least in part, from another image block contained within the same image block group. Moreover, one or more image block groups may be predicted, at least in part, from another image block group contained within the same picture. Notably, the image block groups can be dynamically defined. As used herein, the term "dynamically defined" means that the image blocks selected for each image block group are selected at runtime of an automated process and are not limited to pre-defined image block groupings. As used herein, the term "image block group" means a group of at least two image blocks, each of which comprises a plurality of pixels.

Figure 1:
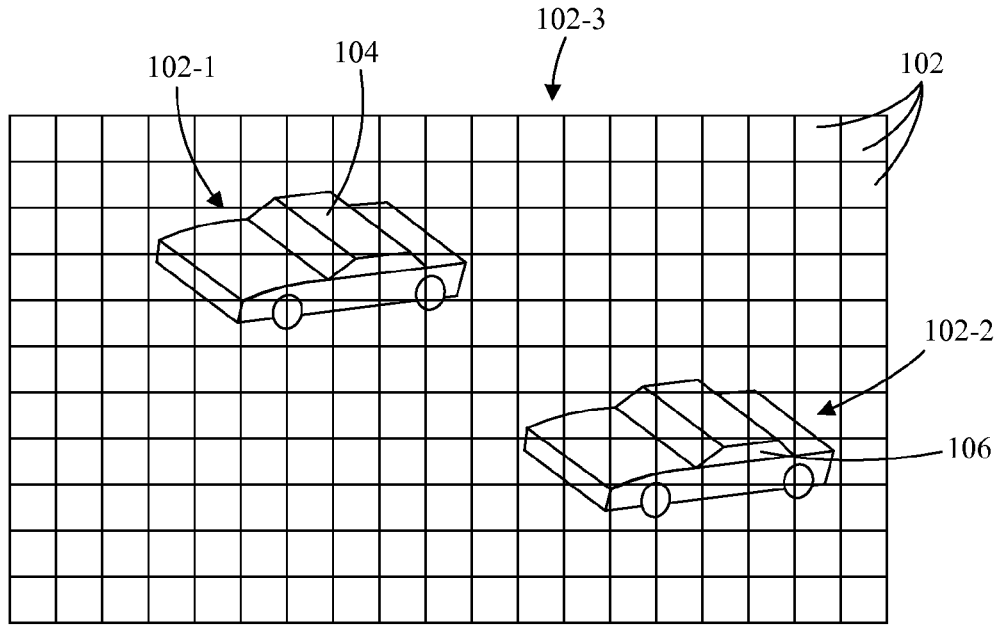
FIG. 1 depicts a picture that is useful for understanding the present invention.

FIG. 1 depicts a picture 100 that is useful for understanding the present invention. Within the picture 100, a plurality of image blocks 102 can be defined. For instance, the picture 100 can be divided into blocks of non-overlapping pixels (hereinafter "pixel blocks"), and each image block 102 can correspond to a respective pixel block. In another arrangement, macroblocks, each of which comprises a plurality of pixel blocks, can be defined. In such an arrangement, each image block 102 can correspond to a macroblock or a portion of a macroblock. By way of example, a pixel block can comprise an 8×8 block of pixels, and a macroblock can comprise four pixel blocks (e.g. a 16×16 block of pixels). Nonetheless, the present invention is not limited to this specific example, and the image blocks 102 can be defined in any other suitable manner.

Groups of image blocks 102 within the picture 100 that have characteristics in common can be identified at runtime of an automated process. For example, a plurality of image blocks 102-1 which have at least one characteristic in common can be identified, and a plurality of image blocks 102-2 also having at least one characteristic in common can be identified. In addition, image blocks 102-3 having one or more characteristics in common also can be identified. In the example, the plurality of image blocks 102-1 can be those image blocks that represent a first object 104 within the picture 100, and the plurality of image blocks 102-2 can be those image blocks that represent a second object 106. Still, other groups of image blocks 102 can be identified and the present invention is not limited in this regard.

The image blocks 102-1, 102-2, 102-3 having common characteristics can be identified in any suitable manner. For instance, the image blocks 102-1 can be identified by comparing motion and/or texture of the image blocks 102-1 to other image blocks 102 within the picture 100, and determining that each of the image blocks 102-1 have a common motion vector and/or texture. Similarly, the image blocks 102-2 can be identified by comparing motion and/or texture of the image blocks 102-2 to other image blocks 102 within the picture, and determining that each of the image blocks 102-2 have a common motion vector and/or texture. As used herein, the term "texture" may refer to luminance coefficients, and/or to both luminance coefficients and coefficients for co-located chrominance blocks.

The characteristic common among the image blocks 102-2 may be the same characteristic that is common among the image blocks 102-1, but this need not be the case. For example, the common characteristic among the image blocks 102-1 can be a color, and the common characteristic among the image blocks 102-2 can be a different color. Alternatively, each of the image blocks 102-1 and 102-2 can have a common characteristic, for instance a motion vector.

Figure 2:
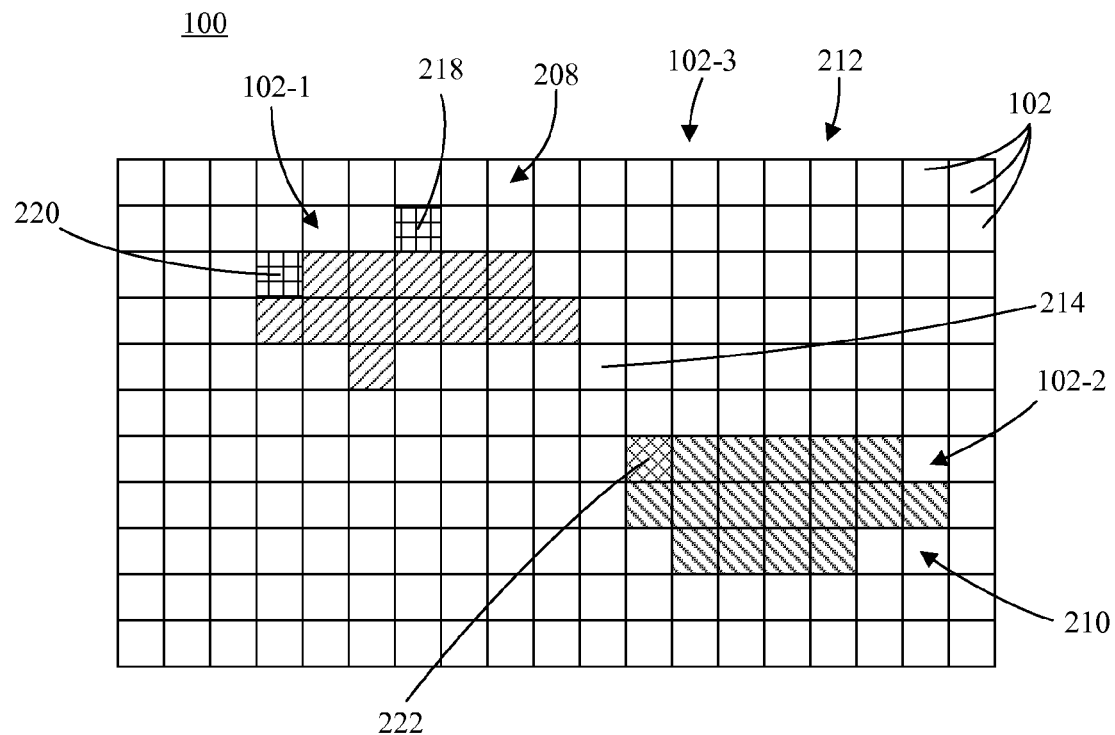
FIG. 2 depicts a view of image block groups defined for the picture of FIG. 1.

FIG. 2 depicts a view of image block groups 208, 210, 212 that may be dynamically defined for the picture 100 of FIG. 1. Referring to FIGS. 1 and 2, the image block group 208 can be defined to comprise the plurality of image blocks 102-1, the image block group 210 can be defined to comprise the plurality of image blocks 102-2, and the image block group 212 can be defined to comprise the plurality of image blocks 102-3.

It should be noted that the image block groups 208-212 need not be predefined. Moreover, the quantity of image blocks 102 contained in each image block group 208-212 also need not be predefined. That is, the image blocks 102 contained in each image block group 208-212 does not need to be determined prior to identifying which image blocks 102 have characteristics in common. Furthermore, although one or more of the image block groups 208-212 can be symmetrical (e.g. square or rectangular), they are not limited in this regard. Indeed, the image block groups 208-212 can have any shape and are not limited to pre-defined shapes.

In an arrangement in which the image blocks 102-1 and the image blocks 102-2 share a common characteristic, other characteristics of the picture 100 can be evaluated to select whether to include all of the image blocks 102-1, 102-2 within a single image block group 208, or whether to assign the image blocks 102-1 to the first image block group 208 and to assign the image blocks 102-2 to the second image block group 210. For instance, a region 214 comprising image blocks 102-3 having characteristics that are different than the image blocks 102-1, 102-2 can be identified as separating the image blocks 102-1 from the image blocks 102-2, thereby indicating that the image blocks 102-1, 102-2 are not contiguous. The image blocks 102-2 identified as not being contiguous with any of the image blocks 102-1 can be assigned to a second image block group 210 that is distinct from the first image block group 208.

An image block group map can be generated for each of the image block groups 208-212 to identify the image blocks 102 contained within each of the respective image block groups 208-212. For instance, each of the image blocks 102 can be assigned an identifier to indicate with which of the image block groups 208-212 it is associated. The image block group maps also can indicate the order in which the image blocks 102 are coded. During playback, the image blocks 102 can be decoded in the same order in which they were coded or in another suitable order. Such order can be determined by processing the image block group maps.

In one arrangement, the data for the image block group maps can be coded explicitly within the respective image blocks 102 and/or the respective image block groups 208-212, for instance within the headers of the respective image blocks 102 or image block groups 208-212. In another arrangement, the image block group maps can be coded via an algorithm that maps the image blocks 102 to their locations within the picture 100. The image block group maps can be compressed using a run length encoding (RLE) scheme or another suitable compression scheme.

Isolation of the image blocks 102-1, 102-2, 102-3 into the respective image block groups 208-212 allows for efficient prediction of image characteristics. More particularly, image characteristics from irrelevant regions of the picture can be excluded from an in-picture prediction process, for instance when coding images in a manner equivalent or similar to that of H.264/AVC.

In this example, the image block groups 208, 210 contain respective image blocks 102-1, 102-2 that represent vehicles. Such image block groups 208, 210 may be generated if the common characteristics upon which the image block groups 208, 210 are selected are motion vectors. However, if another characteristic is used to select the image blocks, such as texture, the image block groupings may be different. For instance, image blocks representing a particular wheel may be assigned to their own image block group. Similarly, image blocks representing an occupant of a vehicle may be assigned to their own image block group, image blocks representing the body of a particular vehicle may be assigned to their own image block group, and so on.

One or more of the image blocks 102 within an image block group 208-212 can be used to predict other image blocks within the image block group 208-212. Moreover, such image blocks 102 also can be used to predict image blocks 102 within one or more other image block groups 208-212. For example, an image block 102-2 in the image block group 210 can be used to predict other image blocks 102-2 within the image block group 210, as well as image blocks 102-1 within the image block group 208.

FIG. 3 depicts a plurality of image blocks 300 useful for understanding image block prediction. To predict a current image block 314, a number of the other image blocks 316 can be considered. For example, if an image block 316-1 is in the same image block group as the image block 314, the image block 314 can be predicted from the image block 316-1, which may be designated as a primary predictor block based on its position relative to the image block 314. If the image block 316-1 is not in the same image block group as the image block 314, then the image block 316-2 can be used as a secondary predictor block to predict the image block 314. If the image block 316-2 is not available, the image block 314 can be predicted from the image block 316-3, if available, or the image block 316-4. It should be noted, however, that there need not be a specific order of priority that is used to select which image blocks 300 are to be used for prediction. Indeed, the best available image block 300, or combination of image blocks 300, can be used.

As used herein, to "predict" an image block means to predict a motion vector and/or one or more texture coefficient values for the image block. The term "predictor block," as used herein, means an image block from which motion vectors and/or texture coefficient values can be predicted for one or more other image blocks. It should be noted that the image block prediction scheme presented in FIG. 3 is but one example of image block prediction, and image block prediction can be implemented in any other suitable manner. For example, a central most image block within an image block group can be used as a predictor block, or an image block can be predicted from a plurality of predictor blocks. Still, any other image block prediction schemes can be implemented and the invention is not limited in this regard.

Continuing with the example of FIG. 3, if such image block prediction is applied to the image block groups 208-212 of FIG. 2, it can be seen that for two image blocks 218, 220, there are no other image blocks 102-1 within the image block group 208 from which the image blocks 218, 220 would be predicted. In the image block group 210, however, all image blocks 102-2 but the image block 222 can be predicted from other image blocks 102-2 within the same image block group 210. In other words, in the image block group 208 there are two image blocks 218, 220 missing predictor blocks, whereas in the image block group 210 there is only a single image block 222 missing a predictor block. Accordingly, the image block group 210 can be coded prior to the image block group 208 to optimize image coding, as will be described.

FIG. 4 depicts image block prediction for the image block group 210 defined in FIG. 2. Assuming the example prediction method presented in FIG. 3 is being implemented for the image block group 210, there are no image blocks 102-2 within the image block group 210 from which to predict the image block 222. Thus, the image block 222 can be predicted from one or more other image block groups in other pictures within a same group of pictures (GOP) as the present picture, or coded without prediction. The remainder of the image blocks 102-2 then can be predicted from the image block 222, though this is not a requirement.

Continuing with the present example, reference is now made to FIG. 5, which depicts image block prediction for the image block group 208 defined in FIG. 2. Since the image blocks 218, 220 do not have other image blocks 102-1 within the image block group 208 from which to be predicted, the image blocks 218-220 can be predicted from the image block 222 as though the image block 222 was their primary predictor (e.g. in position A of FIG. 3 when the image blocks 218, 220 are the current image blocks to be coded, respectively). Any other image blocks 102-2 already coded for the image block group 210, or for another image block group (not shown), also can be used for prediction in addition to, or in lieu of, the image block 222. For instance, the image block 222 can be used for motion vector prediction, while another image block is used to predict texture coefficient values. Similarly, image blocks 524, 526 also can be predicted from the image blocks 222 or other coded image blocks (e.g. other image blocks 102-2), although this is not required since secondary predictors are also available for the image blocks 524, 526.

FIG. 6 depicts image block prediction for the image block group 212 defined in FIG. 2. Again, assume that the prediction method presented in FIG. 3 is being implemented for the image block group 212. In such an arrangement, the image blocks 628, 630, 632 would not have other image blocks 102-3 within the image block group 212 from which to be predicted. Nevertheless, the image blocks 628-632 can be predicted from the image block 218, the image block 220, the image block 222, or any other image blocks 102-1, 102-2 that have been coded. As noted, the image blocks and image block groups used to predict motion vectors need not be the same as those used to predict texture coefficient data.

For example, the image blocks 628-632 can be predicted as if the image block 218 was their primary predictor in position A of FIG. 3. Further, image blocks 634 in an outer most column or row of the image block group 212 also can be predicted from the image block 218, or any other suitable image blocks, in the same manner. Nonetheless, this is not required since other image blocks are available within the image block group 212 for use as secondary predictor blocks, and the image blocks 634 can be predicted using the example prediction scheme presented in FIG. 3.

FIG. 7 depicts elements that may be defined in a header 700 of an image block group. For example, a flag 740 can be defined in the header 700 to indicate whether the motion vectors for the image block group should be predicted from one or more image blocks in other image block groups. Similarly, a flag 742 can be defined in the header 700 to indicate whether texture coefficient values for the image block group should be predicted from one or more image blocks in other image block groups. Further, a flag 744 can be defined to indicate whether both motion vectors and texture coefficient values for the image block group can be predicted from the same image blocks in other image block groups.

A value 746 also can be defined in the header 700 to represent the image block group to be used for prediction. In addition, a value 748 can be defined to represent a block offset within the image block group that is used for prediction. The block offset can correspond to a location within the image block group of the image block(s) used for prediction. Such image block(s) can be the image block(s) used to predict only motion vectors, or to predict motion vectors and texture coefficient data, depending on the settings of the flags 740-744. If the image block(s) identified by the values 746, 748 is only used to predict motion vectors, values 750, 752 can be defined to identify an image block group used to predict the texture coefficient data and the corresponding block offset for the image block(s) used for such prediction. As noted, the image blocks used to predict motion vectors need not be the same as those used to predict the texture coefficient data, nor need the image block groups be the same.

The image block group maps previously described may incur an amount of data overhead to represent the image block mappings. For certain images, however, this data overhead may offset any benefits gained from defining the image block groups. For example, a video sequence requiring that many small image block groups be defined may result in a high header overhead due to the need to use a significant amount of data to create a unique identifier for each block group. Thus, rather than generating image block group maps and performing image block prediction as described, it may be desirable to implement image prediction in another manner.

Figures 8, 9:
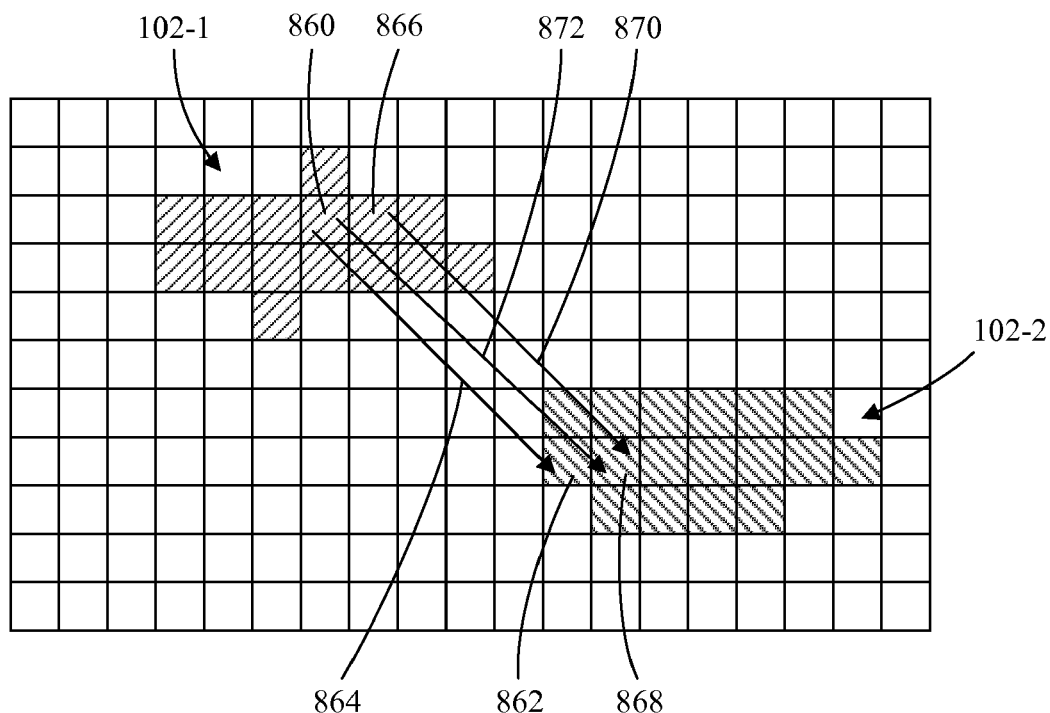
FIG. 8 depicts a view of image block groups defined for the picture of FIG. 1.
FIG. 9 depicts header elements of an image block that are useful for understanding the present invention.

For example, referring to FIG. 8, which depicts another view of image block groups defined for the picture 100 of FIG. 1, one or more image blocks 102-2 can be depicted from one or more image blocks 102-1. Moreover, such image block prediction can be implemented without defining image block groups. For instance, a first image block and at least a second image block that share at least one common image characteristic can be dynamically identified. As used herein, the term "dynamically identified" means that the image blocks selected are selected at runtime of an automated process and are not limited to pre-defined image block associations. At least one other image characteristic of the second image block can be predicted from the first image block.

By way of example, an image block 862 can be predicted from an image block 860 using a displacement vector 864 that identifies an offset between the image blocks 860, 862. The displacement vector can indicate horizontal and vertical displacement values (e.g. as x and y displacements). In the present example, the displacement vector can be represented by the values (5, −5).

Further, the displacement vectors also can be predicted. For instance, assume that the image block 868 adjacent to the image block 862 is predicted from an image block 866 adjacent to the image block 860 based on at least one common image characteristic. Thus, the displacement vector 870 may have the same value as the displacement vector 864. In this case, the displacement vector 870 can be predicted from the displacement vector 864.

In another arrangement, a displacement vector from 872 can be predicted from the displacement vector 864, but the displacement vectors 864, 872 can have different values, for example if both of the image blocks 862, 868 are predicted from the image block 860 based on one or more common image characteristics. If the displacement vectors 864, 872 have different values, an image block value can be defined to represent a difference between the values of the respective displacement vectors 864, 872.

FIG. 9 depicts elements that may be defined in a header 900 of an image block. A flag 980 can be defined in the header 900 to indicate that the motion vector in the image block should be predicted from one or more other image blocks. Similarly, a flag 982 can be defined in the header 900 to indicate whether texture coefficient values for the image block group should be predicted from one or more other image blocks. Further, a flag 984 can be defined to indicate whether both motion vector and texture coefficient values for the image block can be predicted from the same image block(s).

A value 986 also can be defined in the header 900 to represent a displacement vector that identifies the image block used for prediction. Such image block can be the image block used to predict only the motion vector, or to predict the motion vector and texture coefficient data, depending on the settings of the flags 980-984. If the image block identified by the value 986 is only used to predict the motion vector, a value 988 for the corresponding displacement vector can be defined to represent an image block used to predict the texture coefficient data.

Further, flags 990, 992 can be defined to indicate whether the values 986, 988 for the respective displacement vectors are predicted from other displacement vectors. If so, values 994, 996 can be defined to identify such displacement vectors. In such an arrangement, the values 986, 988 can represent the differences between the subject displacement vectors and the displacement vectors from which they are predicted.

Figure 10:
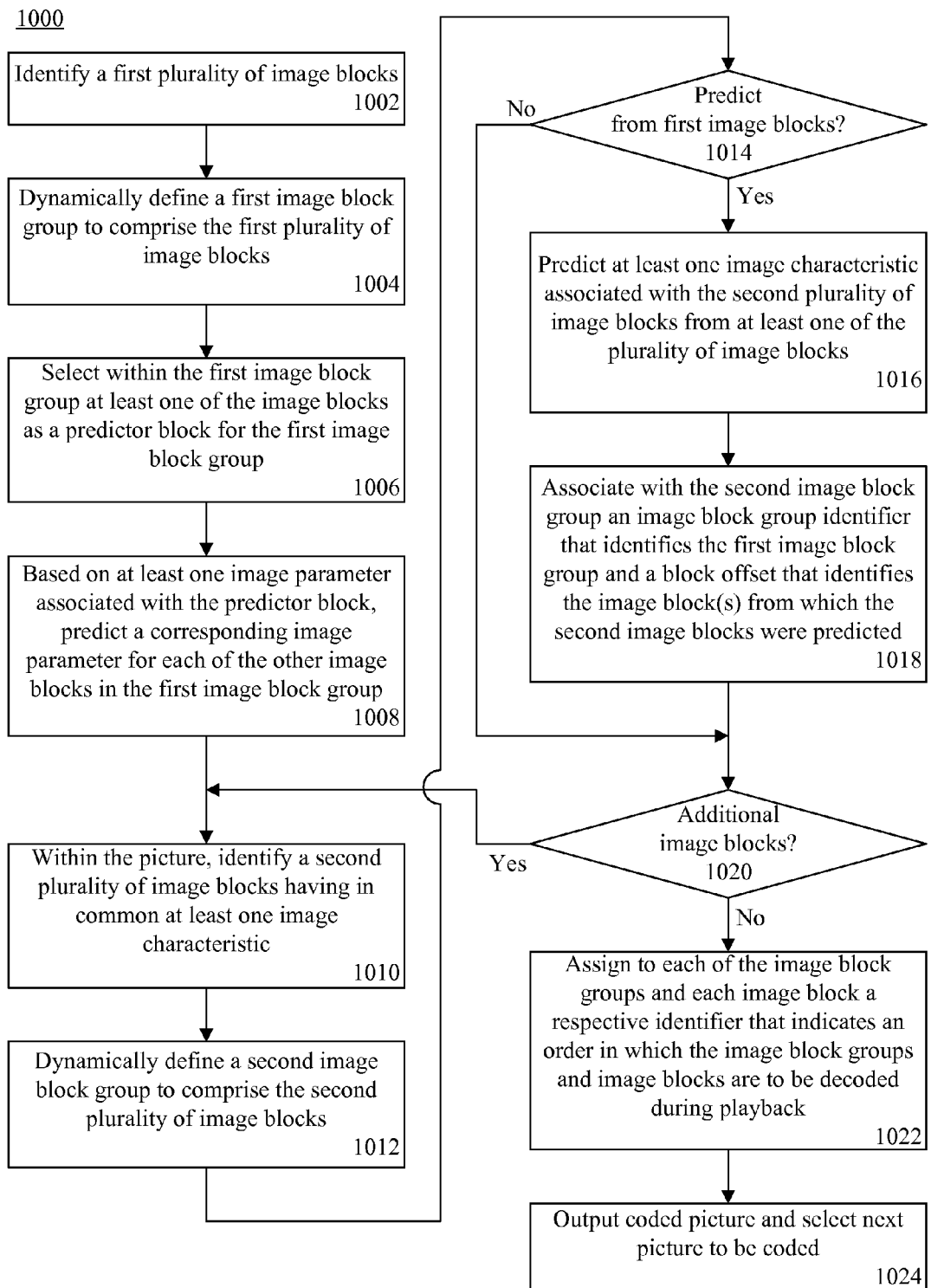
FIG. 10 is a flowchart presenting a method of coding video content that is useful for understanding the present invention.

FIG. 10 is a flowchart presenting a method 1000 of coding video content that is useful for understanding the present invention. The method 1000 can begin in a state in which a determination has been made to encode the video content with dynamically defined image block groups. At step 1002, a first plurality of image blocks can be identified, for instance at runtime of an automated process. At step 1004, a first image block group can be dynamically defined to comprise the first plurality of image blocks. For example, an image block group map that identified the first plurality of image blocks can be generated. As noted, the quantity of image blocks within the first image block group need not be determined prior to identification of the first plurality of image blocks.

At step 1006, within the first image block group at least one of the image blocks can be selected as a predictor block for the first image block group. Continuing to step 1008, based on at least one image characteristic associated with the predictor block, a corresponding image characteristic can be predicted for each of the other image blocks in the first image block group. Such image characteristic can be, for instance, a motion vector and/or texture coefficient data.

At step 1010, within the picture, a second plurality of image blocks can be identified based on having in common at least one image characteristic. In one arrangement, the process of identifying the second plurality of image blocks can include exclusively identifying image blocks that are not contiguous with any of the first plurality of image blocks, though this need not be the case.

At step 1012, a second image block group can be dynamically defined to comprise the second plurality of image blocks. For example, a second image block group map can be generated. The second image block group map can identify the second plurality of image blocks.

Referring to decision box 1014, a determination can be made whether to predict the second plurality of image blocks from one or more of the first image blocks. For example, if the second plurality of image blocks does not have an image characteristic in common with one or more of the first image blocks, the process can proceed to decision box 1020, which will be described. If, however, the image blocks of the second image block group do have an image characteristic in common with one or more of the first image blocks, the process can proceed to step 1016.

At step 1016, one or more image characteristics associated with at least one of the second plurality of image blocks (second image block), such as a motion vector and/or texture coefficient data, can be predicted from one or more of the first plurality of image blocks (first image block), for instance the predictor block previously described. As part of the prediction process, the image characteristic can be associated with the second image block using known techniques. Other image blocks in the second image block group can be predicted from the first image block or the second image block.

At step 1018, an image block group identifier that identifies the first image block group can be associated with the second image block group. In addition, a block offset that identifies the image block(s) from which the second image blocks were predicted also can be associated with the second image block group. For example, values representing the image block group identifier and the block offset can be included within the header of the second image block group.

At decision box 1020, a decision can be made whether to predict additional image blocks from the first plurality of image blocks and/or the second plurality of image blocks. If additional image blocks are to be predicted, the process can return to step 1010. Through steps 1010-1018, the term "second" refers to the image blocks/image block group being predicted, and the term "first" refers to the predictor image block(s)/predictor image block group. Nonetheless, these need not be the same image blocks/image block groups previously identified by the terms "first" and "second".

If additional image blocks are not to be predicted then, at step 1022, a respective image block group identifier that indicates an order in which the image block groups are to be decoded during playback can be assigned to each of the image block groups. In addition, each image block can be assigned an identifier that indicates the order in which the image blocks are to be decoded during playback. The identifiers can correspond to the order in which the image block groups, as well as the image blocks within the image block groups, were coded or any other suitable decoding order. At step 1024, the coded picture can be output and a next picture to be coded, if any, can be selected. As used herein, the terms "output" or "outputting" can include, but are not limited to, storing data in memory, writing to one or more files, presenting on a display or other output device, presenting an audible notification, sending or transmitting to another system, exporting, or the like.

Figure 11:
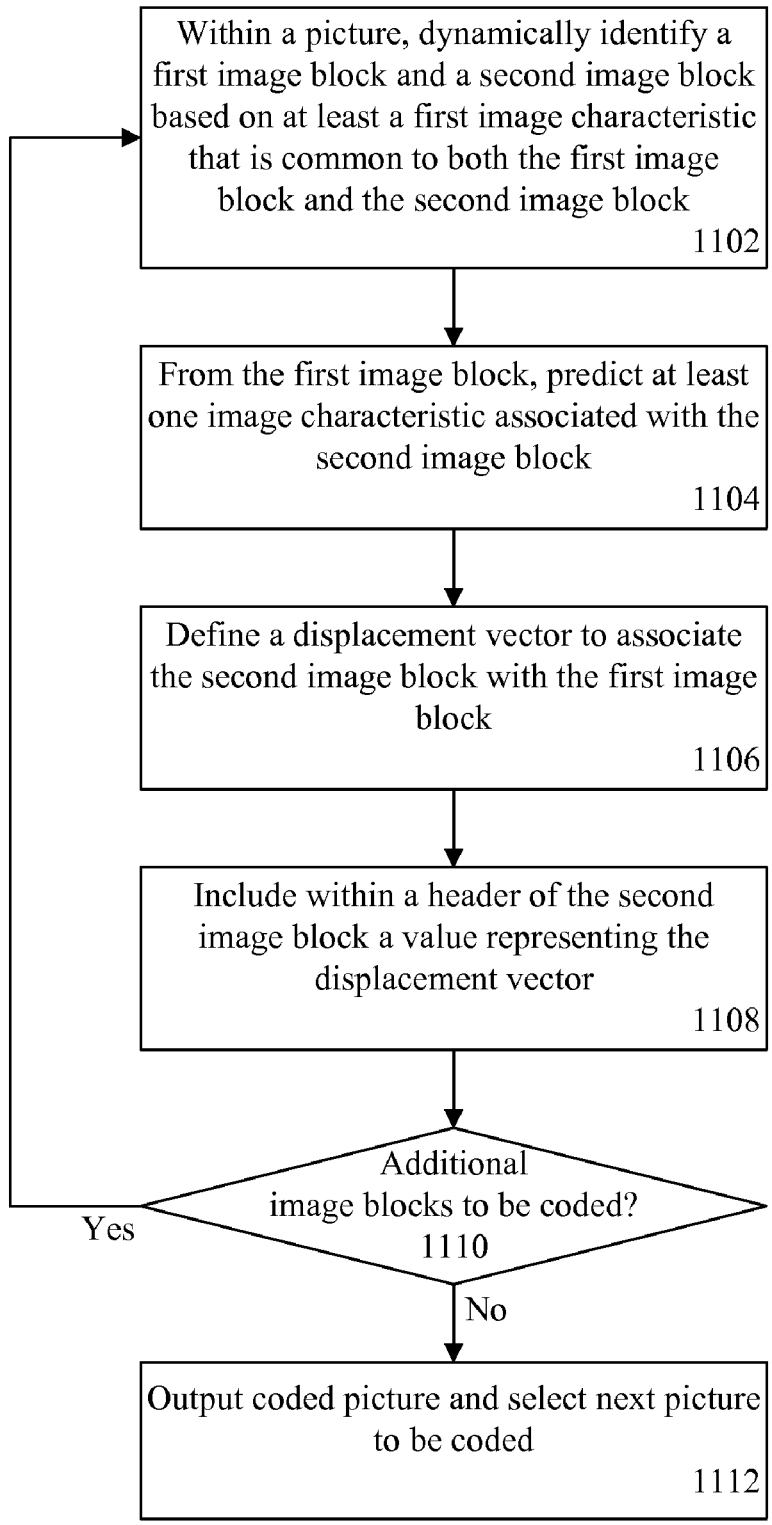
FIG. 11 is another flowchart presenting a method of coding video content that is useful for understanding the present invention.

FIG. 11 is a flowchart presenting a method 1100 of coding video content that is useful for understanding the present invention. The method 1100 can begin in a state in which a determination has been made to encode the video content without using dynamically defined image block groups. At step 1102, within a picture, a first image block and a second image block can be dynamically identified based on at least a first image characteristic that is common to both the first image block and the second image block. The first and second image blocks can be identified, for example, at runtime of an automated process.

At step 1104, at least one image characteristic associated with the second image block can be predicted from the first image block. In that regard, the first image block can be referred to as a "predictor block." At step 1106, a displacement vector can be defined to associate the second image block with the first image block. At step 1108, a value representing the displacement vector can be included within a header of the second image block. In one arrangement, such value can be a value that is predicted from another displacement vector value. For instance, if a value (first value) for a first displacement vector has already been generated for a particular block, a value for the displacement vector of another block can be predicted from the first value.

Referring to decision box 1110, a determination can be made whether there are additional image blocks to be coded. If there are additional image blocks to be coded, the process can return to step 1102. Through steps 1102-1108, the term "second" refers to the image block being predicted, and the term "first" refers to the predictor image block(s). When the steps 1102-1108 are repeated, the first image block may, but need not be, the same image block previously identified as the first image block. Further, the second image block need not be the same image block previously identified as the second image block. At step 1112, the coded picture can be output and a next picture to be coded, if any, can be selected.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Moreover, one or more processes may occur between a first process and a second process.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

This invention can be embodied in other forms without departing from the spirit or essential attributes thereof. Accordingly, reference should be made to the following claims, rather than to the foregoing specification, as indicating the scope of the invention.

What is claimed is:

1. A method of coding video content, comprising:
coding at least one picture within the video content, coding the picture comprising:
within the picture, identifying a first plurality of image blocks based on at least a first image characteristic that is common to each of the first plurality of image blocks;
dynamically defining a first image block group to comprise the first plurality of image blocks;
selecting at least one of the first plurality of image blocks as a predictor block for the first image block group;
for each of the other image blocks in the first image block group, predicting a respective second image characteristic that corresponds to a second image characteristic associated with the predictor block; and
outputting the coded picture.

2. The method of claim 1, wherein dynamically defining the first image block group comprises:
generating a first image block group map that identifies the first plurality of image blocks.

3. The method of claim 1, wherein dynamically defining the first image block group comprises:
defining the first image block group to comprise a quantity of image blocks that is not determined prior to identification of the first plurality of image blocks.

4. The method of claim 1, further comprising:
within the picture, identifying a second plurality of image blocks based on at least a first image characteristic that is common to each of the second plurality of image blocks;
dynamically defining at least a second image block group to comprise the second plurality of image blocks; and
for at least one of the second plurality of image blocks (second image block), predicting at least a second image characteristic associated with the second image block from at least one of the first plurality of image blocks (first image block).

5. The method of claim 4, wherein predicting the second image characteristic associated with the second image block comprises:
identifying at least one image characteristic that is associated with the first image block, the at least one image characteristic selected from a group consisting of a motion vector and texture coefficient data; and
associating the at least one image characteristic with the second image block.

6. The method of claim 4, further comprising:
associating with the second image block group an image block group identifier that identifies the first image block group and a block offset that identifies the first image block.

7. The method of claim 4, wherein dynamically defining the second image block group comprises:
generating a second image block group map that identifies the second plurality of image blocks.

8. The method of claim 4, further comprising:
selecting the second image block as a predictor block for the second image block group.

9. The method of claim 4, wherein identifying the second plurality of image blocks comprises:
exclusively identifying image blocks that are not contiguous with any of the first plurality of image blocks.

10. The method of claim 4, further comprising:
assigning to each of the first and second image block groups a respective image block group identifier that indicates an order in which the respective image block groups are to be decoded during playback.

11. The method of claim 1, wherein identifying the first plurality of image blocks comprises:
identifying the first plurality of image blocks at runtime of an automated process.

12. A method of coding video content, comprising:
coding at least one picture within the video content, coding the picture comprising:
within the picture, dynamically identifying a first image block and at least a second image block based on at least a first image characteristic that is common to both the first image block and the second image block;
from at least a second image characteristic associated with the first image block, predicting at least a second image characteristic associated with the second image block;
defining a first displacement vector to associate the second image block with the first image block;
including within a header of the second image block a value representing the first displacement vector; and
outputting the coded picture.

13. The method of claim 12, further comprising:
identifying at least a third image block based on at least the first image characteristic common to the first and second image blocks;
from the first image block, predicting at least a second image characteristic associated with the third image block;
identifying a second displacement vector to associate the third image block with the first image block; and
including within a header of the third image block a value with which the second displacement vector is predicted from the first displacement vector.

14. The method of claim 12, further comprising:
within the picture, dynamically identifying a third image block and at least a fourth image block based on at least a third image characteristic that is common to both the third image block and the fourth image block;
from the third image block, predicting at least a fourth image characteristic associated with the fourth image block;
identifying a second displacement vector to associate the fourth image block with the third image block; and
including within a header of the fourth image block a value representing a value with which the second displacement vector is predicted from the first displacement vector.

15. The method of claim 12, wherein dynamically identifying the first image block and the second image block comprises:
identifying the first image block and the second image block at runtime of an automated process.

16. A computer program product comprising:
a computer-readable storage medium comprising computer-usable program code stored thereon that codes video content, the computer-readable storage medium comprising:
computer-usable program code that codes at least one picture within the video content comprising:
computer-usable program code that identifies within the picture a first plurality of image blocks based on at least a first image characteristic that is common to each of the first plurality of image blocks;
computer-usable program code that dynamically defines a first image block group to comprise the first plurality of image blocks;

computer-usable program code that selects at least one of the first plurality of image blocks as a predictor block for the first image block group;

computer-usable program code that, for each of the other image blocks in the first image block group, predicts a respective second image characteristic that corresponds to a second image characteristic associated with the predictor block; and computer-usable program code that outputs the coded picture.

17. The computer program product of claim 16, wherein the computer-usable program code that dynamically defines the first image block group to comprise the first plurality of image blocks comprises:

computer-usable program code that generates a first image block group map that identifies the first plurality of image blocks.

18. The computer program product of claim 16, wherein the computer-usable program code that dynamically defines the first image block group to comprise the first plurality of image blocks comprises:

computer-usable program code that defines the first image block group to comprise a quantity of image blocks that is not determined prior to identification of the first plurality of image blocks.

19. The computer program product of claim 16, the computer-readable storage medium further comprising:

computer-usable program code that, within the picture, identifies a second plurality of image blocks based on at least a first image characteristic that is common to each of the second plurality of image blocks;

computer-usable program code that dynamically defines at least a second image block group to comprise the second plurality of image blocks; and computer-usable program code that, for at least one of the second plurality of image blocks, predicts at least a second image characteristic associated with the second image block from at least one of the first plurality of image blocks.

20. A computer program product comprising:

a computer-readable storage medium comprising computer-usable program code stored thereon that codes video content, the computer-readable storage medium comprising:

computer-usable program code that codes at least one picture within the video content comprising:

computer-usable program code that, within the picture, dynamically identifies a first image block and at least a second image block based on at least a first image characteristic that is common to both the first image block and the second image block;

computer-usable program code that, from at least a second image characteristic associated with the first image block, predicts at least a second image characteristic associated with the second image block;

computer-usable program code that defines a first displacement vector to associate the second image block with the first image block;

computer-usable program code that includes within a header of the second image block a value representing the first displacement vector; and computer-usable program code that outputs the coded picture.

* * * * *